US007901286B2

(12) United States Patent
Reeves, III

(10) Patent No.: US 7,901,286 B2
(45) Date of Patent: Mar. 8, 2011

(54) VIDEO GAMING DEVICE AND METHOD OF WAGERING ON A VIRTUAL FOOTBALL GAME

(76) Inventor: Allen Nathanial Reeves, III, Tampa, FL (US)

( * ) Notice: Subject to any disclaimer, the term of this patent is extended or adjusted under 35 U.S.C. 154(b) by 881 days.

(21) Appl. No.: 11/804,606

(22) Filed: May 18, 2007

(65) Prior Publication Data

US 2008/0287183 A1 Nov. 20, 2008

(51) Int. Cl.
*G06F 17/00* (2006.01)

(52) U.S. Cl. .......................................................... 463/25

(58) Field of Classification Search ............... 463/16–25
See application file for complete search history.

(56) References Cited

U.S. PATENT DOCUMENTS

| | | | | |
|---|---|---|---|---|
| 6,077,163 | A | 6/2000 | Walker | |
| 6,135,885 | A | 10/2000 | Lermusiaux | |
| 6,319,123 | B1 | 11/2001 | Paludi | |
| 6,375,568 | B1 | 4/2002 | Roffman | |
| 2001/0046893 | A1 | 11/2001 | Giobbi | |
| 2002/0132660 | A1 | 9/2002 | Taylor | |
| 2003/0060255 | A1 | 3/2003 | Baerlocher | |
| 2003/0060277 | A1 | 3/2003 | Webb | |
| 2003/0119578 | A1 | 6/2003 | Newson | |
| 2009/0117994 | A1 * | 5/2009 | Kelly et al. | 463/25 |
| 2009/0118001 | A1 * | 5/2009 | Kelly et al. | 463/29 |
| 2010/0048302 | A1 * | 2/2010 | Lutnick et al. | 463/42 |

* cited by examiner

*Primary Examiner* — Ronald Laneau
(74) *Attorney, Agent, or Firm* — McNair Law Firm, P.A.; Douglas W. Kim

(57) ABSTRACT

The present invention relates to a video gaming device and method for wagering on a virtual football game, referred to as the "2-Minute Warning game," comprising a video touch screen or display and a selector control panel including a plurality of selector control keys to selectively generate a plurality of passing or running selections and control signals including various football selection signals and wagering selection signals, and a microprocessor including game data comprising a plurality of wager selections and a plurality of passing and running selections corresponding to various outcome signals and wagering selection signals and a predetermined game situation profile; a data processing section including logic to receive the run or passing selection signal and control signals from the plurality of selector control keys to generate display signals in response to the play selection and control signals to be displayed on the video screen or display in response to operator input from the plurality of selector control keys and to generate a football game image on the video screen or display to move the player's team further down the field with awards based on how far the team progresses down the field to reach the first down in 4 plays before starting a new drive to continue playing, or run out of time, which are executed against the predetermined football game situation profile and display the wagering results.

10 Claims, 18 Drawing Sheets

| Component | Description |
|---|---|
| Static Model Renderer | Used to render the stadium and incidental models including the Jumbotron, sideline crates, cherry pickers and so on. |
| Animation Library | Poses, animates, skins and renders the characters |
| Effects/Particle Renderer | The game requires some effects; 'smoke' puffs from the pitch as the player run, dirt/grass particles when they collide or fall to the ground with a progressive alpha particle system |
| Lens Flare | A particle type provided by the effects code above but tied to the camera instead of the world/animating character |
| Point Lights | A limited number of standard point lights for general stadium lighting |
| Texture System | The texture system supports 4 LOD's based on regular Z, ignoring owner type. LOD's are automatically generated in the pipeline where possible |
| Material Effects / Lights | Shaders provide progressive and dynamic lighting effects and also material rendering effects for static and animating models; these include environment mapping, matte surfaces, wet surfaces and so on |
| Crowd Renderer | The grand-stand crowds are rendered; stands are stripped automatically with quads and animated using unlit cookie-cut crowd textures; system supports crowd 'excitement' etc. by varying animation speeds / texture |
| Incidental Character System | The game renders a number of sideline characters; these are characters stand on the side lines, (camera crews for example, reserve players, cheer-leaders etc.) |
| Dynamic Camera | The engine supports a movie-style camera that can basically move in any way; supports a number of camera types such as pan, tracked, chase and so forth. Because of the design of the stadium system however, FOV and other focal length/view point changes are not possible |
| Viewpoint System | Plays are exported around a fixed original so they are movable any on the field. The stadium and camera system dynamically relocate according to the current yard offset and not the origin of the play sequence. |

Figure 5A

| Component | Description |
| --- | --- |
| Scene Management | Determines what is drawn in the scene and what is culled |
| 2D Support | HUD Sprite & 2D animation support |
| Debug Font Support | Simple TTY & font rendering for debugging support / error display |

Figure 5B

| Asset | Description |
|---|---|
| Static Models | Static geometry, (no moving parts); sub-models are supported for culling but local transforms will be removed |
| Animated Models | Skins & skeletons for animating characters |
| Animation Data | Animation key-frames and curves to apply to animating characters |
| Simple Lights | Dynamic lights, (direction and point), will be baked into the static geometry but also carry through the pipeline for run-time character lighting |
| Material Effects | Per-face material effects, (shader and otherwise); includes vertex coloring |
| Motion Mixer: Character Paths | Translation / rotation data for animated character paths |
| Motion Mixer: Camera Paths | *Translation / rotation data for moving cameras* |
| Motion Mixer: Camera Types | Camera Types, (static / path / chase etc.) |
| Motion Mixer: Ball Path | Translation / rotation data for the ball |
| Local Event Tags | Embedded animation tags; used to trigger sounds, particle effects and local character events as required |
| Motion Mixer: Global Event Tags | Tags that follow the 'global' scene timeline; used to trigger events at specific places such as audio and commentary cues, crowd effects, camera switches, HUD display changes etc. |
| Incidental Characters | Models that are displayed as standing on the sideline. |
| Shader Packaging | Shader scripts for advanced lighting/material effects |

Figure 6A

| Asset | Description |
| --- | --- |
| Audio | Mixed SFX tracks used for play simulation |
| Spoken Audio | Commentary and spoken audio streamed from the media source. |
| Music | Musical sequences |
| Textures | 2d images to be applied to models |
| 2D Sprites / Text | 2d elements displayed on the screen |
| HUD Display | On-screen display |
| Movies | Compression support |

Figure 6B

| Asset | File Format | Description |
|---|---|---|
| Max Assets | .MAX<br>.FBX | Max files will process only FBX exported files with the .FBX extension, The FBX file format inherently supports all features of .MAX scenes |
| Spoken Audio | .PCM<br>.OOG | Compressed formats will be supported by pipeline. |
| SFX Audio | .PCM<br>.OOG | Compressed formats will be supported by pipeline. |
| Textures | .TIF<br>.TGA<br>.PNG<br>.DDS | Pipeline will support a variety of different texture formats. |
| 2D Sprites / Text | .TIF<br>.TGA<br>.BMP<br>.PNG<br>.DDS | Pipeline will support a variety of different texture formats. |
| Movies | .BIK | Compression format for movies. |

Figure 7

| Asset Type | Details |
|---|---|
| In-Game 2D | Screen fades / wipes for start & end of scene, replays etc.<br>On-screen "TV" logos & animation<br>Player / game stats & 2D effects<br>2D HUD as required |
| Presentation 2D | Background bitmaps<br>Buttons & Transitions<br>Text/Font<br>Additional front-end art as required |
| Presentation 3D | 3D User Interface models & textures |
| Incidentals | Particle textures / Highlight textures<br>Lens flare & field effects |

Figure 8

| Asset Type | Details |
|---|---|
| On-Field Models | Quarterback<br>Receiver/Pass Defender – 4 body types<br>Offensive/Defensive Lineman – 4 body types<br>Running back – 4 body types<br>Linebacker/Tight End<br>LODs: Near – 8000 faces<br>LODs: Mid-Near – 6000 faces<br>LODs: Mid-Far – 4000 faces<br>LODs: Far – 2000 faces<br>LOD Textures<br>Additional Textures: diffuse map<br>Additional Textures: bump map<br>Additional Textures: specular map<br>Additional Textures: Shader effects<br>Materials per player<br>Skin tone textures |

Figure 9A

| Asset Type | Details |
|---|---|
| On Field Official Models | Referee<br>LODs: Near – 8000 faces<br>LODs: Mid-Near – 6000 faces<br>LODs: Mid-Far – 4000 faces<br>LODs: Far – 2000 faces<br>LOD Textures<br>Additional Textures: diffuse map<br>Additional Textures: bump map<br>Additional Textures: specular map<br>Materials |
| Sideline Models | Coaches<br>Officials<br>Players<br>Press (cameramen, photographers, etc.)<br>Cheerleaders<br>LODs: Near – 8000 faces<br>LODs: Far – 2000 faces<br>LOD Textures<br>Additional Textures: diffuse map<br>Additional Textures: bump map<br>Additional Textures: specular map<br>Materials |

Figure 9B

| Asset Type | Details |
|---|---|
| Modeling | Modeling<br>Texturing & additional materials<br>Field & sidelines modeling<br>Field & sidelines texturing<br>Lighting & finishing |
| Miscellaneous | Incidental objects; benches, coolers, cherry pickers, down markers, TV cameras<br>Billboards and advertising textures |

Figure 10

| Asset Type | Details |
|---|---|
| Mocap Animations | Acquired through mocap animation library |
| Sideline Coaches | Waving<br>Shouting<br>Pacing<br>Idle |
| Sideline Players | Resting<br>Cheering<br>Pacing<br>Drinking |
| Sideline Misc. | Officials: Crouching<br>Officials: Hand Signals<br>Press: Taking photos<br>Cheerleaders: Choreographed cheers<br>Cheerleaders: Primping |
| Celebration Animations | On-Field<br>Off-Field |

Figure 11

| Main | | | | | | |
|---|---|---|---|---|---|---|
| Yard Range | | Prob | Each yard | Once every | Payout | % |
| 90 | 99 | 0.000005 | [illegible] | 200,000 | 250 | 0.00125 |
| 75 | 89 | 0.000045 | 0.000003 | 22,222 | 125 | 0.005625 |
| 60 | 74 | 0.000140 | 0.000009 | 7,143 | 60 | 0.0084 |
| 45 | 59 | 0.000310 | 0.000021 | 3,226 | 30 | 0.0093 |
| 30 | 44 | 0.005000 | 0.000333 | 200 | 15 | 0.075 |
| 15 | 29 | 0.040000 | 0.002667 | 25 | 6 | 0.24 |
| 4 | 14 | 0.104500 | 0.009500 | 10 | 3 | 0.3135 |
| -7 | 3 | 0.850000 | 0.077273 | 1 | 0 | 0 |
| | | 1.000000 | | | | |

| Kickoff | | | | | | |
|---|---|---|---|---|---|---|
| Yard Range | | Prob | Each yard | Once every | Payout | % |
| 90 | 99 | 0.000005 | [illegible] | 200,000 | 1000 | 0.005 |
| 80 | 89 | 0.000045 | 0.000005 | 22,222 | 250 | 0.01125 |
| 70 | 79 | 0.000140 | 0.000014 | 7,143 | 100 | 0.014 |
| 60 | 69 | 0.000310 | 0.000031 | 3,226 | 75 | 0.02325 |
| 50 | 59 | 0.005000 | 0.000500 | 200 | 30 | 0.15 |
| 40 | 49 | 0.040000 | 0.004000 | 25 | 6 | 0.24 |
| 30 | 39 | 0.104500 | 0.010450 | 10 | 3 | 0.3135 |
| 8 | 29 | 0.850000 | 0.038636 | 1 | 0 | 0 |
| | | 1.000000 | | | | 0.757 |

| | |
|---|---|
| First Down Bonus | 2^n X |
| Touch Down Bonus | 100 X |

* Where n is the number of first downs accumulated this drive, including the current one

| Statistics | |
|---|---|
| Credits Bet | 28622360 |
| Credits Won | 25522665 |
| Payout % | 0.891704 |
| Total Plays | 5724472 |
| Average plays per drive | 5.72447 |
| Total yards gained | 22954415 |
| Average yards per drive | 22.9544 |
| Total first downs | 278946 |
| First Down Percent | 0.278946 |
| Hit % | 0.199335 |
| Total Touchdowns | 4309 |
| Average drives per touchdown | 232.072 |

Kickoff Return Payout
0.757

Figure 12

VIDEO GAMING DEVICE AND METHOD OF WAGERING ON A VIRTUAL FOOTBALL GAME

CROSS-REFERENCE TO RELATED APPLICATIONS

U.S. patent application Ser. No. 11/234,603, filed Sep. 23, 2005, and U.S. patent application Ser. No. 11/303,208, filed Dec. 17, 2005, both continuation-in-part of application Ser. No. 10/675,500, filed Sep. 30, 2003. Provisional Application No. 60/678,984, filed May 9, 2005

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

COPYRIGHT NOTICE

A portion of the disclosure of this patent document contains or may contain material, which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

1. Field of the Invention

A video gaming device and method for wagering on a virtual football game that is referred to as the “2-Minute Warning Game,” comprising a video touch screen and a plurality of selector control keys to selectively generate play selections and wagering selections. This invention is a wagering game as well as a football simulation game, in which the player is awarded based on how far the team progresses down the field after selected offensive running and passing formations and a “movie” is viewed of the play selected. The invention presents a game in a 3D format with offensive football plays in a “two minute drill” style.

2. Description of the Prior Art

Video gaming machines for wagering have been widely adopted by the gaming world as the successor to the traditional, reel-based, mechanical slot machine. The term “gaming”, as used herein, indicates that some form of wagering is occurring in the form of currency or an equivalent, e.g. tokens or credits.

The most basic purpose of a gaming apparatus is to display a randomly generated result and its associated payout. Currently, video gaming systems vary greatly in the way they generate the actual representation of a game and its associated results. At any given time, casinos can host hundreds of different games with equally varied features These is a need for engaging and entertaining games that create a competitive interactive play between the player and gaming machine to hold the player’s interest. The present invention is such a video gaming device and method for wagering on a football simulation game, where the player is awarded for moving the team down the field after the player selects various offensive running and passing formations and after a “movie” is viewed of the play selected.

U.S. Pat. No. 6,135,885 describes a method for the player to play a wagering sports game such as football. The player makes a wager and defensive and offensive formations are selected and displayed. The play is run and based upon the outcome obtained the player either wins or loses the wager.

U.S. Pat. No. 6,319,123 describes a method of playing a game including a plurality of events depicted in a series of sequential, non-identical images identified as a first image, a second image and so forth. A first image selected from the plurality of first images is displayed in a frame on a video monitor. Likewise, a selected one of the second images from the plurality of second images is displayed in a second frame. If the images displayed in the frames sequentially depict the first and second images of the event, a winning condition is achieved. An apparatus for performing the method is disclosed.

U.S. Pat. No. 6,375,568 describes to an interactive gaming process and system, comprising a plurality of gaming machines to be played by plurality of players. Each gaming machine comprises a wagering game and a theme game. The wagering game has features that correspond to the theme game wherein the results of the wagering game influence the results of the theme game as the wagering game is being played. The system includes a controller for electronically linking the gaming machines and providing stimuli to the gaming machines to effect gaming machine outputs that are impartial and random. In one embodiment, the plurality of payers play the wagering game as a group wherein if one player’s theme game results meet predetermined criteria, the particular player will play for the group, which will split any jackpot. In another embodiment, the plurality of players play as a group wherein activation of each player’s wagering game either helps or hinders the group as a whole in its effort to achieve a predetermined goal. In another embodiment, the players play their respective wagering game directly completing against each other in the theme game. The results of the wagering games determine the winnings of each player, the eventual winner of the theme game and/or any predetermined jackpot.

U.S. Pat. No. 6,077,163 describes a method and apparatus for operating a gaming device having a flat rate play session costing a flat rate price spanning multiple plays on the gaming device over a pre-established duration. The gaming device identifies price parameters and determines the flat rate price of playing the gaming device.

2001/0046893 describes a game of chance, involving a progression of events conducted on one or more gaming machines. After receiving a wager from a player at a gaming machine, play of the game is initiated. To continue play of the game beginning from a point at which the game was paused, the personal identifier is provided to the central database via the same or another gaming machine and the game status associated with the personal identifier is retrieved from the central database.

2002/0132660 A1 describes a method for wagering on a gaming device where players purchase time on the device as opposed to an individual game where players are allowed to play as many individual games as possible to maximize their returns.

2003/0060255 describes a gaming device having a processor and a display device connected to the processor. The display device displays a plurality of choices to a player, whereby each choice has an associated number of points. The processor provides an initial number of picks to the player. The processor also maintains a regeneration amount, whereby the player receives a new number of picks, if the points associated with the player's choices accumulate at least to the regeneration amount, within the provided number of picks. In one embodiment, accumulating points includes accumulating awards. If the player accumulates a predetermined goal amount of points, the player also wins a goal award.

2003/0060277 describes an apparatus and method for operating a gaming device that enables a player to obtain an award based upon the number of goals the player is able to achieve during game play. The goals advance in difficulty as the player achieves each goal. The game terminates automatically when the player fails to achieve a goal.

2003/0119578 describes a gaming machine and a method of operation such a gaming machine. Comprising a video screen adapted to display a game of chance involving game events having random outcomes including winning outcomes and losing outcomes; and means adapted to display a range of video clips, each video clip being designated as either a winning video clip or a losing video clip; wherein the machine displays one of the winning video clips in response to one of the winning outcomes of a game event, and displays one of the losing video clips in response to one of the losing outcome of a game event.

2006/0094490 describes a video gaming device and method of wagering on a virtual round of golf or golf game comprising a video touch screen or display and a selector control panel including a plurality of selector control keys to selectively generate a plurality of golf stroke selections and control signals including golf stroke selection signals and wagering selection signals, and a microprocessor including game data comprising a plurality of wager selections and a plurality of club selections corresponding to the golf stroke selection signals and wagering selection signals and a predetermined game situation profile; a data processing section including logic to receive the golf stroke selection signal and control signals from the plurality of selector control keys to generate display signals in response to the club selection and control signals to be displayed on the video screen or display in response to operator input from the plurality of selector control keys and to generate a golf game play image on the video screen or display as the golf stroke executed against the predetermined golf game situation profile and display the wagering results.

Despite these efforts, there is a need for new entertaining interactive gaming devices to maintain players' interest level in wagering on gaming machines.

BRIEF SUMMARY OF THE INVENTION

The present invention relates to a video gaming device and method for wagering on a virtual football game, referred to as the "2-Minute Warning game." The video gaming device comprises a game cabinet to support a video screen or display, a selector control panel and a wagering/payment mechanism and to house a microprocessor.

This is a betting game as well as a football simulation game, where you are awarded for moving your team down the field. The overall premise of the game is to move your team further down the field. The player will place a bet and then select an offensive running or passing play formation. After the play has been simulated through a "movie," the player is awarded based on how far the team progresses down the field. Bonuses will be awarded for a first down and a touchdown. If a player fails to reach the first down in 4 plays, they must start a new drive to continue playing, or they run out of time.

Game play is two tiered. A drive is started when the player receives a kickoff and lasts until the player gets a touchdown, fails to get a first down, runs out of time, cashes out, or runs out of money and does not add more. A drive is made of multiple plays. A play, or game does not start until the player selects a play, and ends when the play simulation has finished. Regardless of which play is chosen, the player has the same chances to move down the field.

The payouts are separated into ranges of yards gained. Specific yard ranges are subject to change to supplement different payout percentages. Within these ranges, the player has the same chance of getting each of the specific yards gained. Play results that win money are: a kickoff return of 30 or more yards, a normal play of 4 or more yards, plays that result in a first down, and plays that result in a touchdown. First down and touchdown wins are bonuses that stack with wins from yards gained.

The selector control panel comprises a plurality of selector control keys to generate game selections signals, including passing and running play selections and wagering selections; while the wager/payment mechanism comprises a plurality of apertures to receive payment by the game player and means to generate a payment signal.

The microprocessor includes game data comprising a plurality of wager selections and a plurality of running and passing plays for a football game. A data processing station, including logic, receives the game selection signals from the selector control keys and payment signals from the wage/payment mechanism and to generate display signals in response to the game selection signals and payment signals to be displayed on the video screen or display in response to player input from the selector control keys and wager information in response to input from the wager/payment mechanism, and to generate play images on the video screen executed against the preprogrammed course plan and a preprogrammed situation profile and display the wagering results.

The invention accordingly comprises the features of the selector control panels, combinations of wagering/betting elements, and arrangement of the simulation football active play that is exemplified in the description hereinafter set forth, and the scope of the invention is indicated in the claims.

BRIEF DESCRIPTION OF THE SEVERAL VIEWS OF THE DRAWING

These and other objects of the present invention will become evident from the following illustrations:

FIGS. 5A and 5B are tables, illustrating the components that make up the game engine that are specifically relevant to this invention.

FIGS. 6A and 6B are tables, illustrating all exportable assets that are specifically relevant to this invention.

FIG. 7 is a table that details the tools and file formats used by the exemplary embodiment that are specifically relevant to this invention.

FIG. 8 is a table, illustrating the 2D In-Game assets and presentation that are specifically relevant to this invention.

FIGS. 9A and 9B are tables, illustrating character modeling an exemplary embodiment that is specifically relevant to this invention.

FIG. 10 is a table, illustrating the stadium asset an exemplary embodiment that is specifically relevant to this invention.

FIG. 11 is a table, illustrating animation and rigging an exemplary embodiment that are specifically relevant to this invention.

FIG. 12 illustrates the payout tables for the game play an exemplary embodiment that are specifically relevant to this invention.

DETAILED DESCRIPTION OF THE INVENTION

In the following detailed description of sample embodiments of the invention, reference is made to the accompanying figures that form a part hereof, and that is shown by way of illustration specific sample embodiments, in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. It is essential to an appreciation of the practice of the present invention that the jurisdictional approval requirements and the industry standards of the gaming industry be considered in determination of the skill and technical sophistication of the present technology and invention.

The present invention relates to a video gaming device and method for wagering on a virtual football game. As shown in FIGS. 1 through 12, the video gaming device comprises a game cabinet and base to operatively support a video screen and a selector control panel and a wager/payout mechanism and to house a microprocessor.

Figure 1:
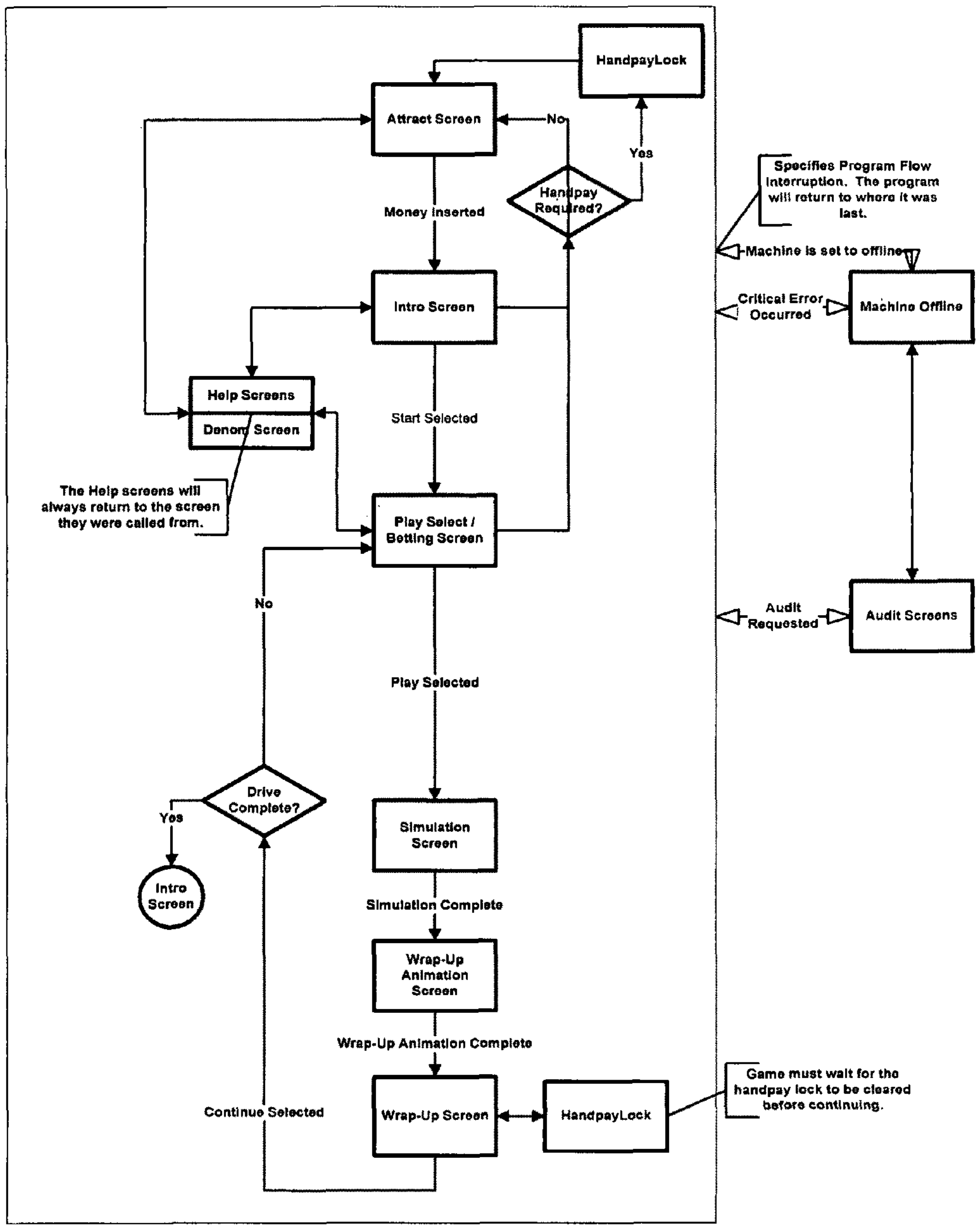
FIG. 1 is the embodiment of the present invention, illustrating an overview of the program flows that are specifically relevant to this invention.
Figure 2A:
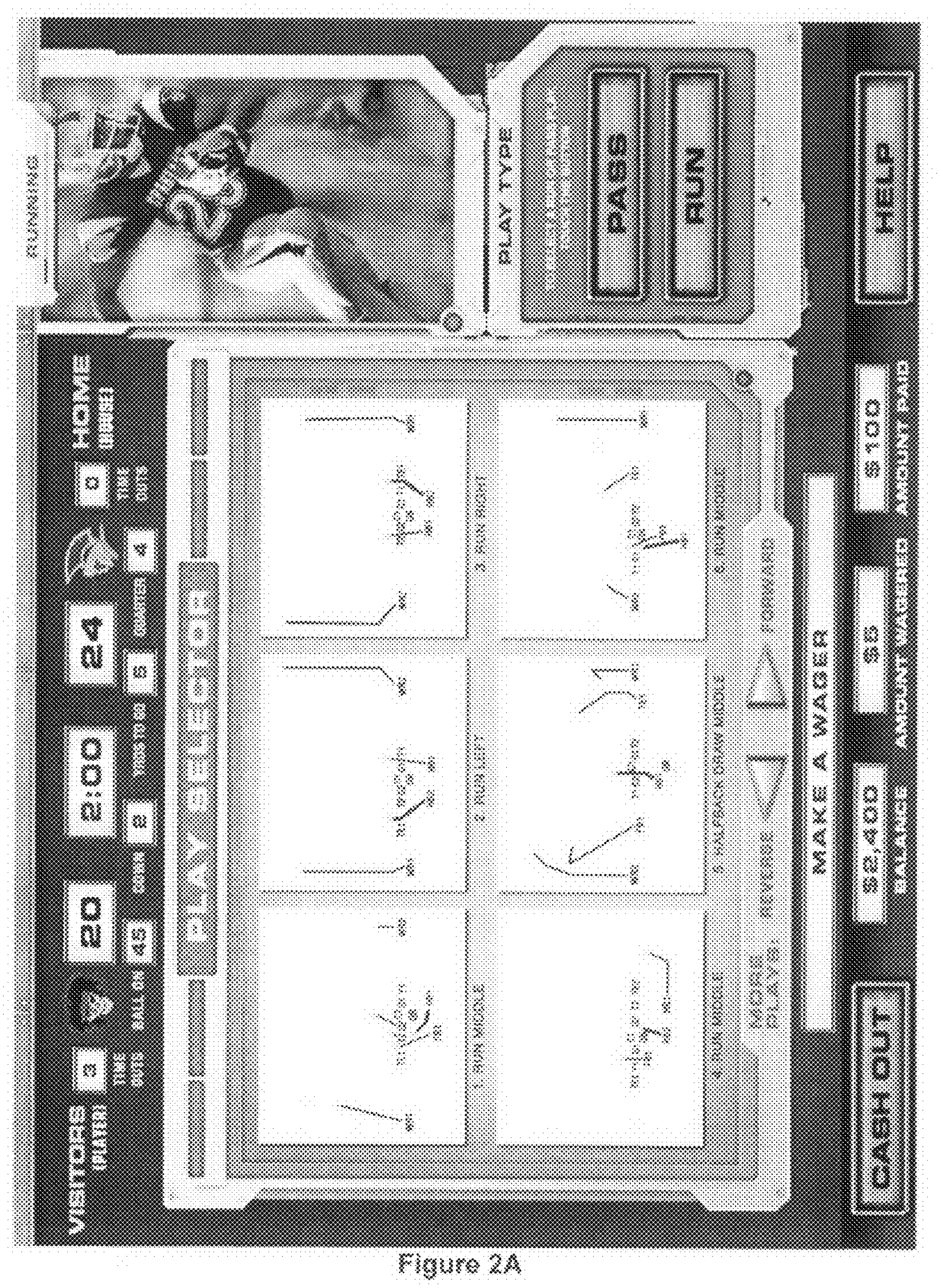
FIG. 2A is a diagram of the display screen, illustrating the random running plays 1 through 6 that are specifically relevant to this invention.
Figure 2B:
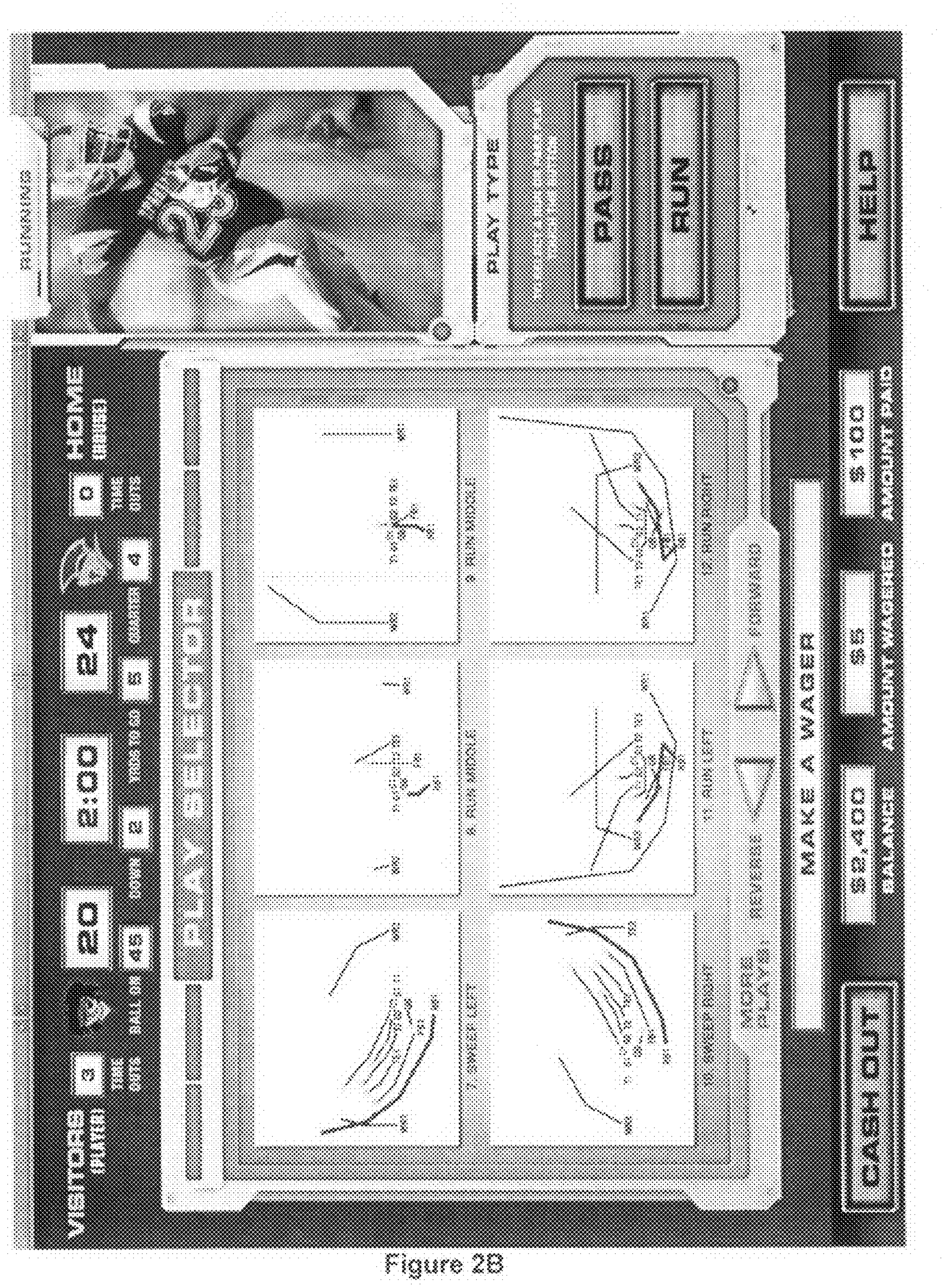
FIG. 2B is a diagram of the display screen, illustrating the random running plays 7 through 12 that are specifically relevant to this invention.
Figure 2C:
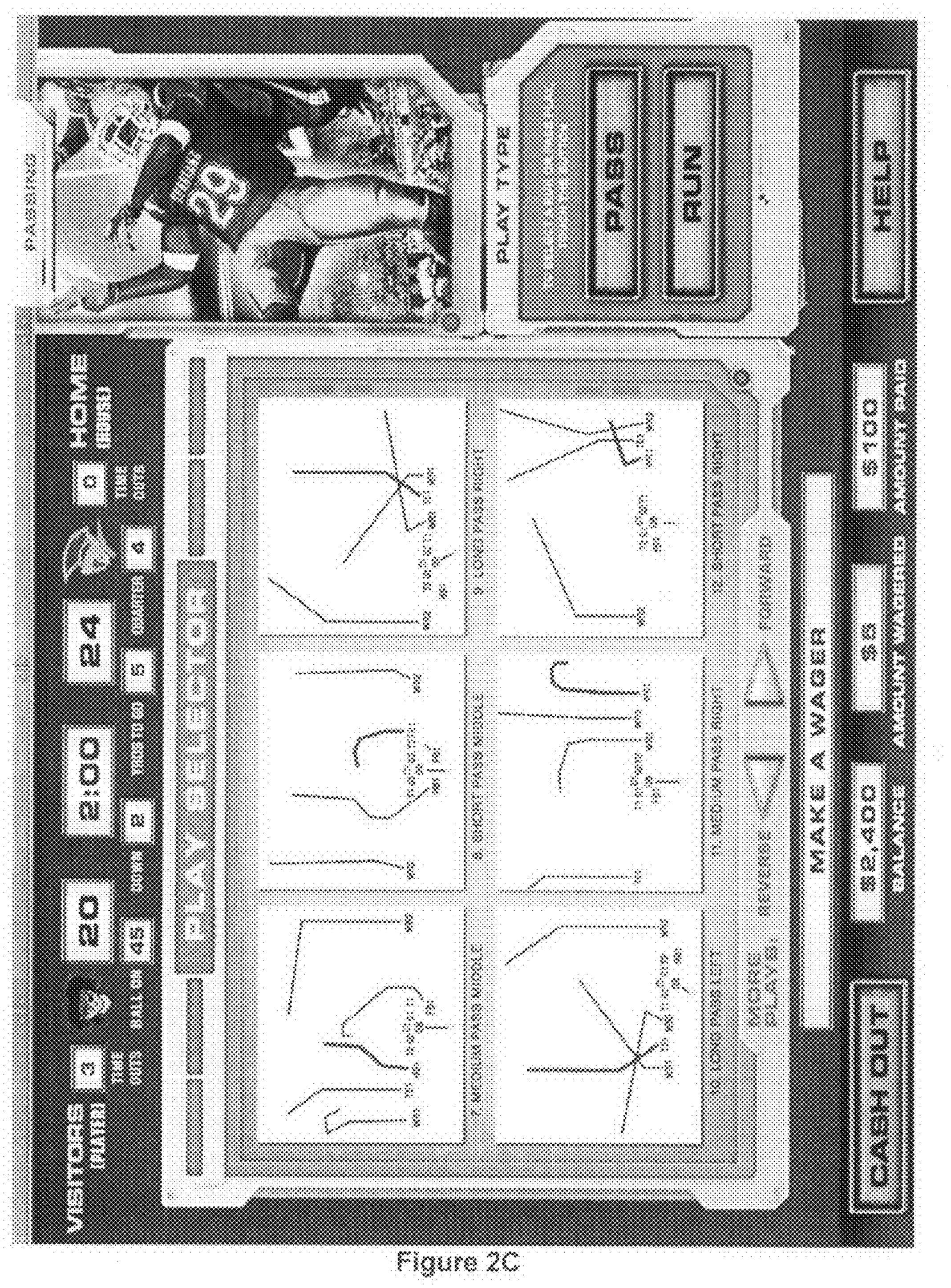
FIG. 2C is a diagram of the display screen, illustrating the random passing plays 1 through 6 that are specifically relevant to this invention.
Figure 2D:
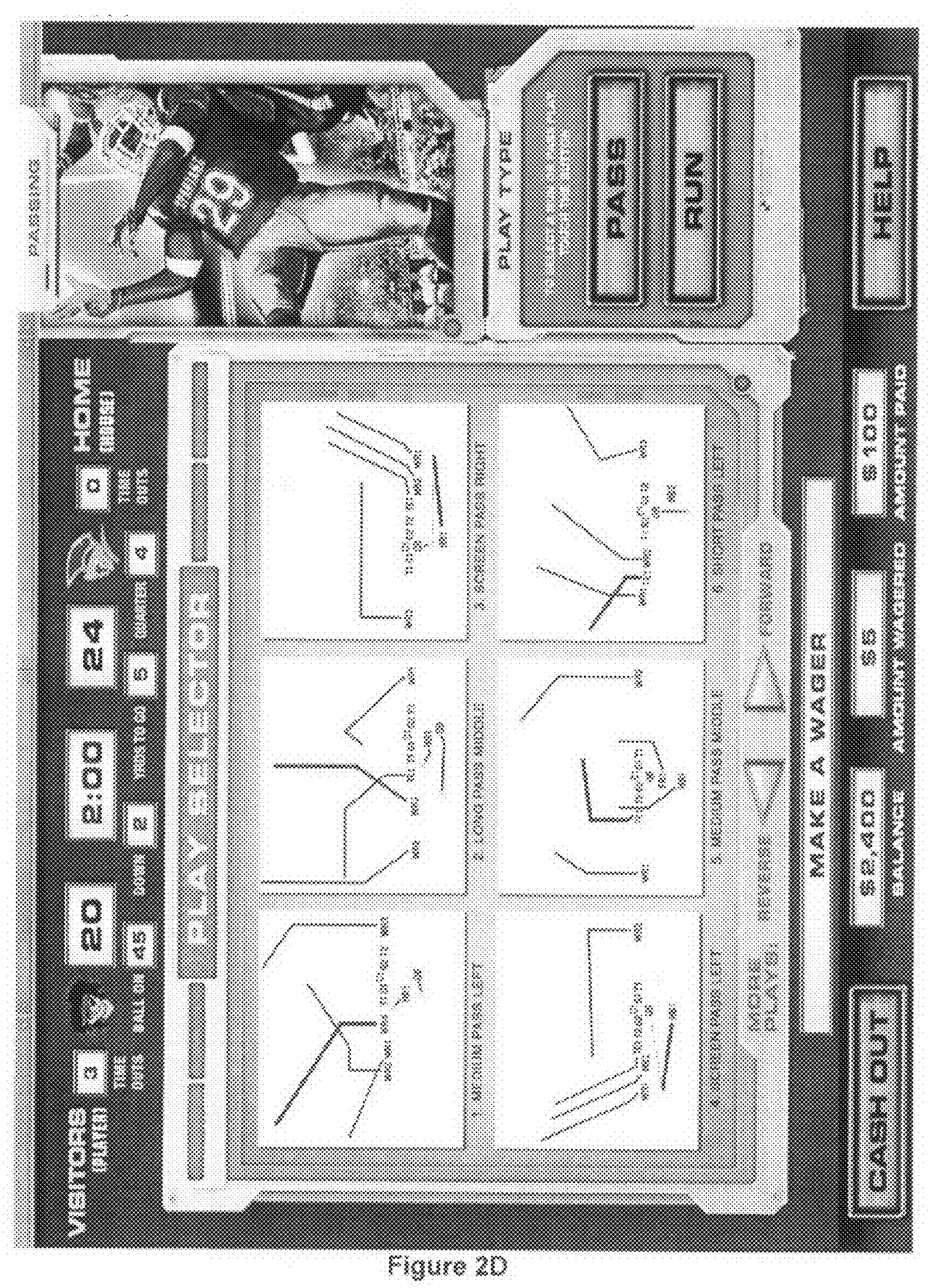
FIG. 2D is a diagram of the display screen, illustrating the random passing plays 7 through 12 that are specifically relevant to this invention.

FIG. 1 illustrates the overview of the program flow with the game divided into the following game play screens: the Attract Screen, Intro Screen, Betting Screen, Help Screen, Play Selection Screen, Simulation Screen, Wrap-up Animation Screen and Wrap-up Screen.

The game has four modes of operation: play, demo, test and audit. The play mode is the mode when the game is in operation. This mode is where a player inserts money and plays the game. Demo mode allows for the demonstration of the game without impacting meters or other information on the game. The test mode combined with the demo mode allows testing of the game portion of the engine. All metering for the Game is displayed in the audit screens.

A Play represents a single offensive formation. The first play in a drive is the kickoff return and its pay is divided into the following pay ranges: (1) 0-29 yards [no payout], (2) 30-39 yards, (3) 40-49 yards, (4) 50-59 yards, (5) 60-69 yards, (6) 70-79 yards, (7) 80-89 yards, (8) 90-99 yards.

For plays from scrimmage other than the kickoff return, the following yard ranges are used: (1) minus 10-plus 3 yards [no payout], (2) 4-14 yards [2 to 1 payout], (3) 15-29 yards, (4) 30-44 yards, (5) 45-59 yards, (6) 60-74 yards, (7) 75-89 yards, (8) 90-99 yards [1,000 to 1 payout]. The bonus for a touchdown is a multiplier on the current bet. The first down bonus is a multiplier based on the number of first downs previously gained and this multiplier increases exponentially. As an alternative, touchdown and first down bonuses can be flat credit amounts independent of the current bet.

As shown in FIG. 1, the Attract Screen is an animation sequence/loop that shows the game in action without the player being involved. It cycles between sample plays yet be different enough that players know that the game is in Attract mode. From this screen the player is able to insert money, view the help screens and change the game denomination (if enabled). When a player inserts money, he is immediately taken to the Intro Screen. There is a 15-30 second delay from the time a player cashes out until the attract animation sequence begins.

As shown in FIG. 1, the Intro Screen is an intermediate screen that occurs after the insertion of money, but before the start of a drive. On this screen, the player has the option to view the Help Screen, cashout, insert money, change the game denomination (if enabled) or start the drive. Once the player chooses to start the drive, a brief animation plays signifying the start of the game and the game clock starts.

As shown in FIG. 1, the Help Screen describes the paytable and the rules of the game and it describes all payout ranges and associated payouts as well as all possible bonus awards.

As shown in FIG. 1, from the Start Screen the player is allowed to cashout, insert money, change the denomination, and select a bet, which changes to the Betting Screen. The Betting Screen shows each bet amount as a separate button, and includes buttons for max bet, and to repeat the previous bet. Once a bet is selected the Betting Screen immediately moves to the Play Select Screen 01.

Figure 3:
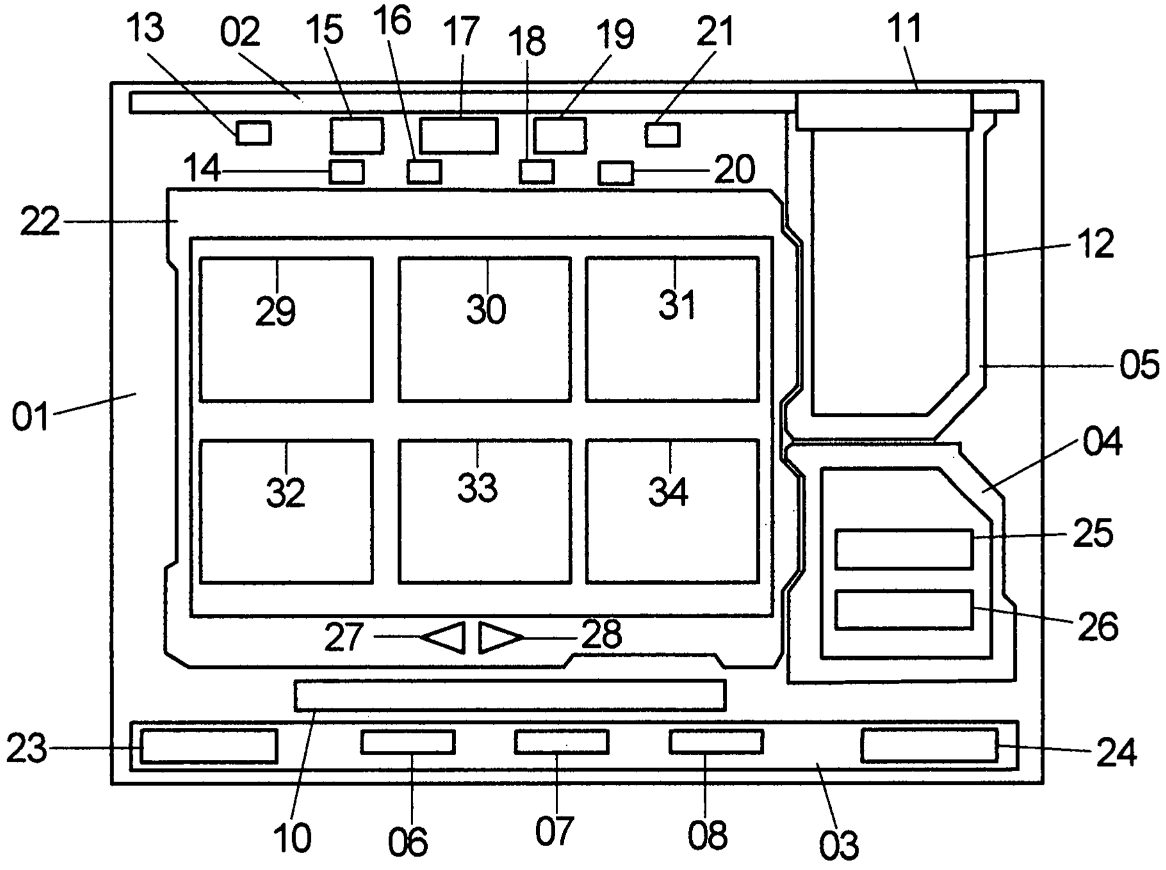
FIG. 3 is a diagram, illustrating the Play Selection Screen that is specifically relevant to this invention.

As shown in FIGS. 1 and 3, after the player places a bet the Betting Screen changes to the Play Select Screen 01. This screen allows the player to select a play in the Play Type Select Window 4 from a list of 12 passing plays 25 by pressing the Go to Next Page of Plays 28 or Go to Previous Page of Plays 27 and 12 running plays 26 for a total of 24 Play Depiction/Play Select Buttons 29 through 34, but only 6 plays are visible at one time on the Play Selector Frame 22, see FIGS. 2A, 2B, 2C and 2D for the pass and run play selection choices, which randomly change. Each individual play consists of multiple variations. An Information Bar 10 is provided to assist the player. The Play Mode Display Window 5 illustrates the Play Mode Graphic 12 and the type of play selected is illustrated by the Play Mode Indicator 11. The player is allowed to return to the Betting Screen, view the Help Screen, or cashout by pressing a hardware cashout button. Once a play is chosen, the game switches to the Simulation Screen (Active Play "movie" Screen) 36.

Figure 4:
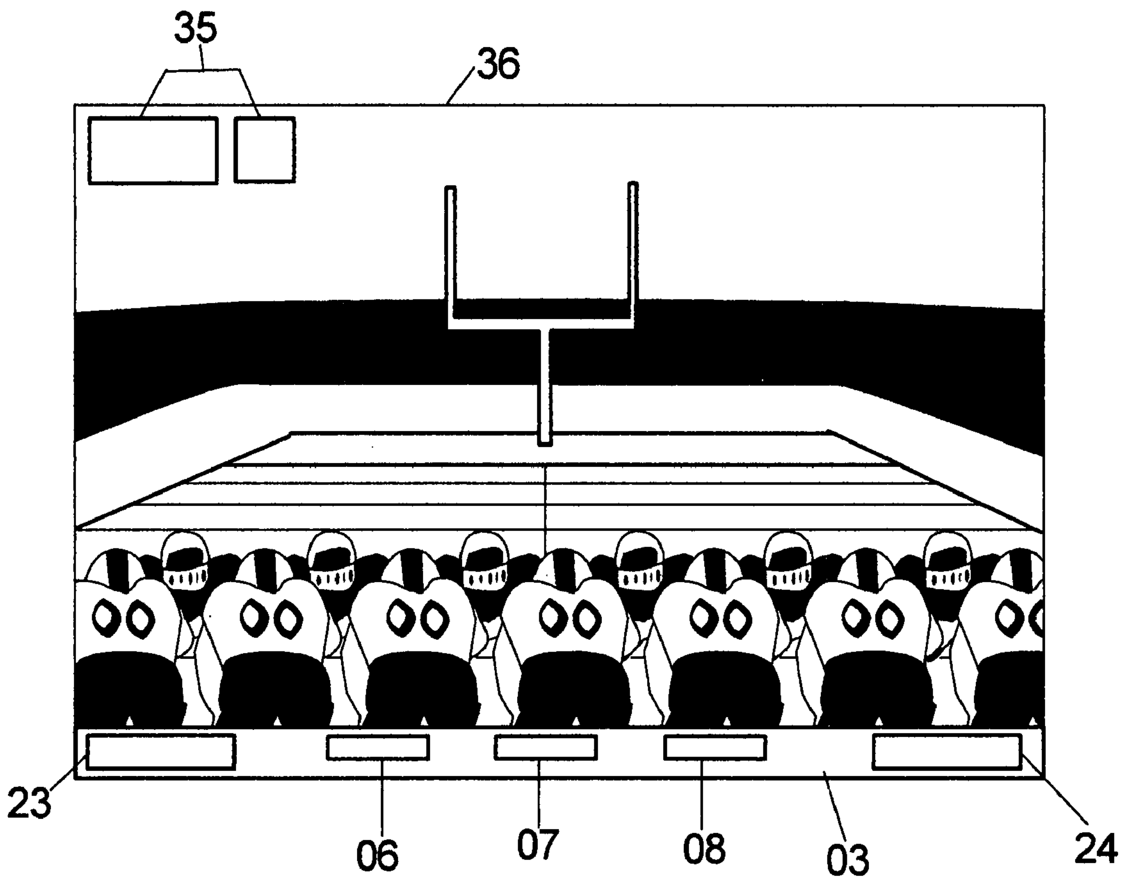
FIG. 4 is a diagram, illustrating the Simulation (Active Play "movie") Screen that is specifically relevant to this invention.

As shown in FIGS. 1 and 4, the Simulation Screen 36 simulates the chosen play and its outcome. By watching the play, the player sees how many yards are gained. The Simulation Screen tracts the Time Remaining 17, Time Outs Visitor 13, Ball On 14, Visitor Score 15, Home Score 19, Down 16, Yards To Go 18, Quarter 20, Time Outs Home 21 and Heads UP Display 35. When the simulation is completed, the Wrap-Up Animation Screen is displayed.

As shown in FIG. 1, the Wrap-Up Animation Screen shows any post-play animations. This Screen includes random celebrations/disappointments based on the outcome of the play. These celebrations/disappointments may take the form of a player dance, fireworks display, coach animations and comments, or some other suitable "movie" scenes. The Wrap-Up Screen shows the result of the previously run play. It includes yards gained, credits awarded for yardage, first down bonus (if any), touch down bonus (if any), and total credits won. This screen shows information related to the completion of a drive. The completion of a drive occurs for one of three reasons, either the player has made a touchdown, the player was unable to get a first down in 4 plays, or the player ran out of time. The drive Wrap-Up screen displays to a player one of these reasons before returning to the Intro Screen. This Screen notifies the player, if his credit amount has reached 0 and he needs to insert more credits to continue the current drive. The player is required to insert money within a specific amount of time before the game drive ends. The game clock 17 is paused during this time.

Each of the Screens described above have options for player interactions. For the Betting Screen, the bet buttons allows the player to change the current bet. The Max Bet button allows the player to change the current amount to the maximum allowed bet. The Repeat Bet button changes the current amount the player is betting to the amount the player bet in the previous game. The buttons that change the current bet are only accessible during the Betting Screen.

In the Play Select Screen 01, the player selects the next play desired. The simulation shown on the following Simulation Screen 36 shows the selected play in action, "movie" scenes.

The Help button 24 allows the player to view the Help Screen and related game information.

The game machine stores a list of names and assets for additional player uniforms and logos on the game media. The names, uniforms, and logos can be changed to a new set of these through the setup section of the audit screens without requiring a code change or recompile. As shown in FIG. 3, the Play Selection Screen 01 is a touch screen view of the game and has a top graphic frame 02 and a bottom graphic frame 03 that includes the machine information of Cashout 23, Bet 07, Balance 06, Paid 08 and Help 24.

The Game Engine presents the game in a 3D format with only offensive football plays in a 'two minute drill' style. The player selects from 24 random offensive plays and the game ends after four downs. The outcome is determined, after the player selects the play, by the number of yards his team completes. After the play, a secondary scene may be played. If successful, a Celebration Scene is selected and visa-versa for failure. A Celebration Scene for example might include a shot of the cheerleaders and the players congratulating each other.

The game is implemented using a custom "mini" 3D-Engine and the Game Engine is written using OpenGL and run at 60 Hz. FIGS. 5A and 5B illustrate the components that make up the Game Engine.

As shown in FIG. 5A, a simple static model renderer is supported. Sub-transforms are not required as there are no models with moving or rotating pieces. Any sub-transforms are baked at export time, so each model consists of a single local transform. Sub-models are useful for culling, so anything below a local transform is preserved, A separate variant of the model renderer is used for skinned characters to accommodate scaling etc. and to allow separate optimization of animation rendering.

As shown in FIG. 5A, the animation system is simplified in that the system has a constant frame rate and 'known' transitions. With a constant frame rate, the system can forgo tweening and speed scaled interpolation. The system supports blending, although only 'all channel' blending is required and only 2-way blending, as the system never blends between more than two animations. The animation system uses standard forward kinematics, (unlimited chain length), to pose a limited number of skeleton key-frames. As the system has a fixed frame rate, (and so animation playback speed), interpolated animation curves are easier to construct. Once the pose buffer has been filled for a particular frame, the skeleton is skinned. The system supports scaling per character to add some variation to players using the same animation, (independent all-axis). As scaling is not required by the static model renderer, the animation system uses its own renderer, which also allows the system to optimize characters separately, (character models may not support the full set of material effects for example, or restrict the number of dynamic light sources). Individual animation frames may also be tagged with events that carry through the exporter into the run-time engine. Tags can be added for any additional cues/triggers required by the game that are tied to animation, (for example, dirt flying from a characters feet or sound cues). Tags may carry commentary cues.

As shown in FIG. 5A for Material Effects, Material (surface) effects is implemented using shaders. The platform graphics hardware supports the shader 3.0 specification, so any and all current pixel shader effects are used. The system supports traditional material effects, such as environment mapping, (at least for the sky on liquid surfaces); stadium lights on top of helmets and so on. Vertex shaders are not required by the static rendering system, but may be used by the animation system.

As shown in FIG. 5A for Lighting, the animation system supports a fixed number of lights per character. The system has bake lights into the static stadium geometry and incidental models; lights are applied to dynamic elements. Shadows are supported when they are modeled with the character and exported from Max. Characters do not self shadow. Simple point lights are supported with radius, fall off and material characteristics, (dependant on the type of material effects required by art), along with directional, (ambient), lights. As lights are baked on static geometry any number of directional and point lights may be used. Only directional lights are baked on animating models, (prior to a play beginning).

As shown in FIG. 5A for the Crowd Renderer, the Crowds in the stands have animating textures and automatically generated/placed strips. The cookie-cut alpha strips are drawn with animating textures representing the crowd. Some degree of control over animation speed is possible allowing crowd excitement. Crowd strips are affected by directional lights, but not point lights.

As shown in FIG. 5A for the Particle Effects Renderer, simple particle effects are supported with limited faked physics. Only a few particle effects are required such as flying grass/dirt, lens flare, etc. Alpha flats only are supported without point light support. Particles support simple gravity physics and local rotation/texture animation.

As shown in FIG. 5A for the Incidental Character System, the game renders a number of fake sideline characters with limited animation standing on the side lines, such as camera crews, reserve players, cheer leaders, etc.

As shown in FIG. 5A for the Dynamic Camera, the camera is an important character in the game with complete unhindered movement of the camera around the scene. Camera movement carries through the pipeline and the camera moves dynamically with the scene in the same way as an animating character. Lens flare and any other ambient effects are applied automatically. Like the animation system, the camera system is simplified, running at a constant frame rate. No interpolation between movement 'frames' is required, or speed scaling due to uneven frame rate.

As shown in FIG. 5B for the Viewpoint System, the design documents present plays as separate scenes at multiple yard lines; in effect however, only the yard line, (position on the pitch), changes and not the scene itself. To maximize art resources scenes consist of moving and animating components only, (players, camera, ball, particles etc.). The stadium, incidental geometry and lighting are managed and rendered separately and 'moved' to the origin of the scene according to the current yard line. The engine supports global offsets on transforms which are baked once at the start of a play to the correct yard line offset. The animating/moving components stay where they are and always are offset at origin. The field cam follows the length, (or breadth), of the field and not the action. Cameras tied to the field then correctly follow the offset stadium and not the localized scene and visa-versa for moving objects.

As shown in FIG. 5B for the Scene Management, the system has regular frustum culling performed separately for animating characters and static geometry.

As shown in FIG. 5B for the 2D Support, the game is presented in "TV Broadcast" style; that means HUD displays showing channel style logos, player names, scores and so forth.

As shown in FIG. 5B for the Debugging Font Support, the engine supports a simple text system for debugging display and on-screen information that is not seen, but supports on-screen display of error messages, (loading errors, missing assets, etc.).

For the Audio Support, the game requires two forms of audio; static audio for spot FX and streaming audio for commentary. For both types of audio, the system uses the Microsoft DirectSound, (DirectShow), API. XPe supports DirectSound (DirectShow) extensions. Crowd effects use the SFX system, with the addition of pitching and cross fading for excitement/emotion, etc.

The Autodesks's FBX file format is a 3D asset specification, in which the FBX format supports everything needed for TMW including: Mesh geometry, Skinned Geometry, Animation, Lighting, Animation/movement paths and Material & Shader effects.

FIGS. 6A and 6B detail all exportable assets that are supported by the MAX 8.0 Motion Mixer. The Motion Mixer works as an animation controller or audio sequencer, but for an entire scene.

FIG. 7 details the tools and file formats used by the build pipeline. All tools are based on the same base executable that will include general support such as file processing for single or multiple files, conversions, command line switch processing, error reporting and XML parsing. Tools support dependency checking, so assets are recomplied only when they change.

FIG. 8 is a breakdown of the art in the major 2D In-Game asset and presentation.

FIGS. 9A and 9B illustrate the character modeling asset types and descriptions.

FIG. 10 illustrates the Stadium asset modeling and details.

FIG. 11 illustrates the animation and rigging assets and details.

FIG. 12 details the payout tables for the simulated game by providing probability and payout for the plays, statistics and kickoff. The player selects a play from the betting screen of 12 running and 12 passing plays see FIGS. 2A, 2B, 2C, and 2D. Each individual play consists of multiple variations. Each variation is separate and unique and results in a finite set of scenes. A scene is an individual "movie" that the player views after he selects his play. The scene by definition is a predetermined outcome.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is thus to be understood that the invention is not limited to the disclosed embodiments, but modifications and variations in the present invention may be made without departing from the novel aspects of this invention as defined in the claims. It is intended that this invention be limited only by the claims, and the full scope of equivalent arrangements included within the spirit and scope of the claims.

The invention claimed is:

1. A video gaming device for wagering on a virtual football game, comprising a video touch screen or display and a selector control panel and including a plurality of selector control keys to selectively generate a plurality of running and passing selections and a plurality of wage selections, and control signals and including selection signals and wagering selection signals, and a microprocessor including game data comprising a plurality of wager selections;

said device is divided into the following game play screens: the Attract Screen, Intro Screen, Betting Screen, Help Screen, Play Selection Screen, Simulation Screen, Wrap-up Animation Screen, and Wrap-up Screen;

said Attract Screen is an animation sequence/loop that shows the game in action without the player being involved and cycles between sample plays and the player is able to insert money;

said Help Screen describes the pay table and the rules of the game and it describes all payout ranges and their associated payouts as well as all possible bonus awards;

said player chooses to start the drive, a brief animation plays signifying the start of the game and the game clock starts, followed by the Betting Screen;

said player has placed a bet the Betting Screen changes to the Play Select Screen;

said Play Select Screen allows the player to select a play, which represents a single offensive formation, from a list of 12 passing plays and 12 running plays for a total of 24 plays that randomly change with each Play selection, but only 6 plays are visible at one time on the screen for the play selection choices;

said Simulation Screen simulates the chosen play and its outcome and by watching the play, the player sees how many yards are gained;

said simulation is completed, the Wrap-Up Animation Screen is displayed;

said Wrap-Up Animation Screen shows post-play animations;

said Wrap-Up Animation Screen includes random celebrations/disappointments based on the outcome of the play, taking the form of a player dance, fireworks display, coach animations and comments, or some other suitable form;

said Wrap-Up Animation Screen shows the result of the previously run play and includes yards gained, credits awarded for yardage, first down bonus (if any), touch down bonus (if any), and total credits won;

said Wrap-Up Animation Screen shows information related to the completion of a drive in which either the player has made a touchdown, the player was unable to get a first down in 4 plays, or the player ran out of time;

said Betting Screen, the bet buttons allow the player to change the current bet and the Max Bet button allows the player to change the current amount to the maximum allowed bet and the Repeat Bet button changes the current amount the player is betting to the amount the player bet in the previous game;

said game machine stores a list of names and assets for additional player uniforms and logos on the game media;

said Game Engine presents the game in a 3D format with only offensive football plays in a 'two minute drill' style;

said player selects from 24 randomly offensive plays and the game ends after four downs;

said outcome is determined after the player selects the play by the number of yards his team completes;

said play, a secondary scene may be played, or if successful, a celebration scene will be selected and visa-versa for failure;

said game is implemented using a custom "mini" 3D-Engine;

said Game Engine will be written using OpenGL and run at 60 Hz;

said animation system is simplified in that the system has a constant frame rate and 'known' transitions;

said system supports blending and the system never blends between more than two animations;

said animation system uses standard forward kinematics, (unlimited chain length), to pose a limited number of skeleton key-frames;

said system supports scaling per character to add some variation to players using the same animation, (independent all-axis);

said animation system uses its own renderer which allows the system to optimize characters separately;

said Material (surface) effects are implemented using shaders and the graphics hardware supports the shader 3.0 specification and supports traditional material effects such as environment mapping; and, said animation system supports a fixed number of lights per character with bake lights into the static stadium geometry and incidental models and simple point lights are supported with radius, fall off and material characteristics, along with directional, (ambient), lights.

2. The video gaming device of claim 1 whereas the Dynamic Camera with complete unhindered movement moves dynamically with the scene in the same way as an animating character with Lens flare and any other ambient effects applied automatically and at a constant frame rate no interpolation between movement 'frames' is required, or speed scaling due to uneven frame rate.

3. The video gaming device of claim 1 whereas the Viewpoint System presents plays as separate scenes at multiple yard lines with only the yard line, (position on the pitch), changing and not the scene itself and the stadium, incidental geometry and lighting managed and rendered separately and 'moved' to the origin of the scene according to the current yard line.

4. The video gaming device of claim 1 whereas the engine supports global offsets on transforms which are baked once at the start of a play to the correct yard line offset and the animating/moving components stay where they are and offset at origin and the field cam follows the length, (or breadth), of the field and not the action.

5. The video gaming device of claim 1 whereas the Scene Management system has regular frustum culling performed separately for animating characters and static geometry.

6. The video gaming device of claim 1 whereas for the 2D Support, the game is presented in "TV Broadcast" style with HUD displays, showing channel style logos, player names, scores and so forth.

7. The video gaming device of claim 1 whereas for the Audio Support, the game uses two forms of audio; static audio for spot FX and streaming audio for commentary.

8. The video gaming device of claim 1 whereas the MAX 8.0 Motion Mixer works as an animation controller or audio sequencer, but for an entire scene.

9. The video gaming device of claim 1 whereas the player selects a play from the Betting Screen that consists of multiple variations, in which each variation is separate and unique and results in a finite set of scenes.

10. The video gaming device of claim 1 whereas the player selects a play from the Betting Screen, resulting in a scene that is an individual "movie," which the player views after he selects his play and which is by definition a pre-determined outcome.

* * * * *